UNITED STATES PATENT OFFICE 2,547,230

INCREASING THE MELTING POINT OF POLYMERIZED ROSIN

Alfred L. Rummelsburg, Wilmington, Del., assignor to Hercules Powder Company, Wilmington, Del., a corporation of Delaware No Drawing. Application August 18, 1949, Serial No. 111,090

9 Claims. (Cl. 260—99.5)

This invention relates to the fractionation of polymerized rosin and more particularly to a method for the separation of a fraction of increased melting point from polymerized rosin.

It is known to fractionate polymerized rosin by means of selective solvents and to separate a fraction having less tendency to crystallize. The process leaves much to be desired, however, as far as the production of a polymerized rosin of increased melting point is concerned. It is also known to obtain a polymerized rosin of higher state of polymerization by distilling off the oils and unpolymerized rosin to recover as the residue a dark-colored polymerized rosin of higher melting point. Such a product is of reduced acid number due to factors such as anhydride formation and/or lactonization during the distillation process. This product, while higher melting in contrast to that of the product of the selective solvent process, is unsatisfactory for many uses because of its dark color and reduced aicd number.

Now in accordance with this invention, it has been found that a polymerized rosin fraction melting higher than the polymerized rosin from which it is obtained is produced by mixing polymerized rosin, containing unpolymerized constituents, in solution with a hydrocarbon-miscible solvent, with a liquefied normally gaseous hydrocarbon at a temperature below about 0° C. and separating the insoluble fraction which precipitates as a polymerized rosin of increased melting point.

The process of this invention is illustrated by the following examples in which all parts are parts by weight unless otherwise stated. All melting points were obtained by the Hercules Drop Method.

EXAMPLE 1

A solution was made by dissolving 16 parts polymerized rosin, melting point 113° C. and acid number 146, in 15 parts gasoline having a boiling range of 96–127° C. This solution was then added in a thin stream to 210 parts of vigorously agitated liquefied butane at −10° C. Part of the polymerized rosin dissolved and part separated as a finely-divided powder. The insoluble part was separated by filtration and was washed with 77 parts butane at −10° C. The precipitated polymerized rosin amounted to 38.1% of the polymerized rosin after fusion to remove occluded solvent. It melted at 160° C. and had an acid number of 147. The polymerized rosin fraction recovered from the butane solution melted at 90° C.

The data on Example 1 are tabulated in Table I along with data on other examples carried out in substantially the same manner as Example 1 showing the results obtained on other samples of polymerized rosin using other liquefied normally gaseous hydrocarbons and different mixing temperatures.

Table I

| Example | 1 | 2 | 3 | 4 | 5 | 6 | 7 |
|---|---|---|---|---|---|---|---|
| Polymerized Rosin: | | | | | | | |
| Melting Point (drop), °C | 113 | 104 | 113 | 104 | 104 | 104 | 113 |
| Acid Number | 146 | 160 | 146 | 160 | 160 | 160 | 146 |
| Parts | 16 | 32 | 14 | 16 | 63 | 16 | 16 |
| Solvent (Gasoline¹), Parts | 15 | 32 | 17 | 15 | 62 | 15 | 16 |
| Normally Gaseous Hydrocarbon: | | | | | | | |
| Isobutylene (Parts) | | | | | | 200 | |
| Propane (Parts) | | | | | | | 200 |
| Butane (Parts) | 210 | 420 | 180 | 210 | 210 | | |
| Mixing Temperature, °C | −10 | −10 | −10 | −60 | −60 | −60 | −10 |
| Polymerized Rosin Product: | | | | | | | |
| Yield (per cent) | 38.1 | 5.0 | 35.7 | 35.0 | 31.1 | 61.1 | 25 |
| Melting Point (drop), °C | 160 | | 158 | 121 | 123.5 | 120 | 155 |

¹ Narrow range gasoline, boiling range 96–127° C.

In all of these examples the polymerized rosin is added to the liquefied normally gaseous hydrocarbon in the form of a solution in gasoline. The preferred solvent is a hydrocarbon solvent and more particularly an aliphatic or cycloaliphatic hydrocarbon because such solvents do not exert too great a solubilizing action on the polymerized rosin in the presence of the liquefied normally gaseous hydrocarbon at low temperatures. The preferred hydrocarbon solvents include the lower paraffin hydrocarbons from about $C_4$ to about $C_{10}$, methyl cyclopentane, cyclohexane, and methyl cyclohexane. However, other solvents such as aromatic hydrocarbons, terpenes, halogenated solvents as carbon tetrachloride, ethylene chloride, methylene chloride, chloroform, trichloroethane; ethers, as diethyl ether and diisopropyl ether; esters, as ethyl acetate, isopropyl acetate and ethyl propionate; and ketones as acetone and methyl ethyl ketone may also be used. The solvent is preferably a volatile solvent so that the soluble portion of the polymerized rosin may be recovered therefrom and it should be miscible in all proportions with the liquefied normally gaseous hydrocarbons.

The concentration of the polymerized rosin solution which is mixed with the liquefied normally gaseous hydrocarbon should be sufficient to promote fluidity of the solution but should not be so dilute that the solvent is capable of having a strong solubilizing effect at reduced temperatures in the presence of the liquefied normally gaseous hydrocarbon. Thus, the concentration of the polymerized rosin will normally be kept within the range of about 65% and 35% of the total solution.

The polymerized rosin solution may be mixed with the liquefied normally gaseous hydrocarbon either by adding the solution to the liquefied normally gaseous hydrocarbon or by adding the liquefied normally gaseous hydrocarbon to the polymerized rosin solution. The preferred procedure is that of mixing the polymerized rosin solution in the liquefied normally gaseous hydrocarbon because in that manner there is effected a rapid cooling action which leads to a more finely-dispersed and more completely fractionated polymerized rosin which is readily filterable. The use of vigorous mechanical agitation during the mixing is preferred.

The normally gaseous hydrocarbons useful in the fractionation process include methane, ethane, propane, normal- and isobutanes, and the normally gaseous pentanes, isobutylene, ethylene, propylene, butylenes, cyclopropane, cyclobutane, etc. These may be used in pure form or in mixtures. Methane, for example, is preferably used in admixture with one or more of the other hydrocarbons. The preferred hydrocarbon is propane because of its ease in handling, because it gives the highest yield of product of commercially desirable melting point, and because it does not require high-pressure equipment.

The ratio of liquefied normally gaseous hydrocarbon to polymerized rosin used in the fractionation process of this invention will depend somewhat on the temperature of the resulting mixture. This ratio may vary over a somewhat restricted range of about 20:1 to about 2:1. The preferred ratio is within the range of about 13:1 to about 4:1.

The temperature of the fractionating mixture for effecting separation of a substantial amount of polymerized rosin of increased melting point may be any temperature below about 0° C. For economic reasons the temperature will normally not be lower than about −100° C. Although this is above the boiling point of methane, methane may be used at this temperature using pressure equipment especially in admixture with other liquefied normally gaseous hydrocarbons.

The polymerized rosins which may be fractionated by precipitation with a normally gaseous liquefied hydrocarbon are made by treating a natural wood or gum rosin or tall oil rosin with a polymerizing agent such as volatile metal halides, as boron trifluoride, zinc chloride, stannic chloride, aluminum chloride, ferric chloride; mineral acids, as sulfuric acid, phosphoric acid; fuller's earth; hydrogen fluoride; acid salts, as sodium acid sulfate; etc., hydrofluoroboric acid; etc., according to methods known to the art.

Although the process of this invention may be carried out on any polymerized rosin, it is preferably applied to those polymerized rosins having a drop melting point of at least 100° C., since it is particularly suitable for the production of polymerized rosin of melting points higher than is readily attainable by commercial methods.

The fractionation process may be carried out in a single step or in a plurality of steps. Thus, the first fraction precipitated may be dissolved in a solvent and be again fractionated by dissolving in a solvent and mixing with a liquefied normally gaseous hydrocarbon at reduced temperature to precipitate a polymerized rosin of increased melting point. Likewise, the portion soluble in the liquefied normally gaseous hydrocarbon can be fractionated further by cooling to a lower temperature or by mixing with a lower boiling liquefied normally gaseous hydrocarbon or both to get a polymerized rosin fraction which is useful as such or which can be further fractionated to obtain a polymerized rosin of still higher melting point.

The polymerized rosins of increased melting point made by the process of this invention may be subjected to any desirable subsequent treatment. Thus, for example, they may be subjected to refining treatments if it is desired to improve their color. The polymerized rosin may thus be dissolved in a high-boiling hydrocarbon solvent such as gasoline or kerosene and be treated with selective solvents for removal of the color bodies. Likewise, a solution of the polymerized rosin of this invention may be refined by means of adsorbents such as adsorbent earths.

The process of this invention in being carried out at relatively low temperatures has the advantage of not depending upon pressure equipment since pressures above atmospheric can be avoided by operating at a sufficiently low temperature.

What I claim and desire to protect by Letters Patent is:

1. The process of fractionating a polymerized rosin containing unpolymerized constituents which comprises mixing said polymerized rosin, in solution with a hydrocarbon-miscible solvent, with a liquefied normally gaseous hydrocarbon at a temperature below about 0° C., and separating the insolubilized fraction as a polymerized rosin of increased melting point.

2. The process of fractionating a polymerized rosin containing unpolymerized constituents which comprises mixing said polymerized rosin, in solution with a hydrocarbon-miscible solvent, with liquefied butane at a temperature below about 0° C., and separating the insolubilized fraction as a polymerized rosin of increased melting point.

3. The process of fractionating a polymerized rosin containing unpolymerized constituents which comprises mixing said polymerized rosin, in solution with a hydrocarbon-miscible solvent, with liquefied propane at a temperature below about 0° C., and separating the insolubilized fraction as a polymerized rosin of increased melting point.

4. The process of fractionating a polymerized rosin containing unpolymerized constituents which comprises mixing said polymerized rosin, in solution with a hydrocarbon solvent, with liquefied butane at a temperature below about 0° C., and separating the insolubilized fraction as a polymerized rosin of increased melting point.

5. The process of fractionating a polymerized rosin containing unpolymerized constituents which comprises mixing said polymerized rosin, in solution with a hydrocarbon solvent, with liquefied propane at a temperature below about 0° C., and separating the insolubilized fraction as a polymerized rosin of increased melting point.

6. The process of fractionating a polymerized rosin containing unpolymerized constituents which comprises adding said polymerized rosin, in solution with a hydrocarbon-miscible solvent, to a liquefied normally gaseous hydrocarbon at a temperature below about 0° C., and separating the insolubilized fraction as a polymerized rosin of increased melting point.

7. The process of fractionating a polymerized rosin containing unpolymerized constituents which comprises adding said polymerized rosin, in solution with a hydrocarbon-miscible solvent, to a liquefied butane at a temperature below about 0° C., and separating the insolubilized fraction as a polymerized rosin of increased melting point.

8. The process of fractionating a polymerized rosin containing unpolymerized constituents which comprises adding said polymerized rosin, in solution with a hydrocarbon solvent, to a liquefied butane at a temperature below about 0° C., and separating the insolubilized fraction as a polymerized rosin of increased melting point.

9. The process of fractionating a polymerized rosin containing unpolymerized constituents which comprises adding said polymerized rosin, in solution with a hydrocarbon solvent, to a liquefied propane at a temperature below about 0° C., and separating the insolubilized fraction as a polymerized rosin of increased melting point.

ALFRED L. RUMMELSBURG.

REFERENCES CITED

The following references are of record in the file of this patent:

UNITED STATES PATENTS

| Number | Name | Date |
| --- | --- | --- |
| 1,806,973 | Humphrey | May 26, 1931 |
| 2,142,592 | Waligora | Jan. 3, 1939 |
| 2,310,374 | Rummelsburg | Feb. 9, 1943 |